US011429281B2

(12) United States Patent
Bhargava et al.

(10) Patent No.: US 11,429,281 B2
(45) Date of Patent: *Aug. 30, 2022

(54) SPECULATIVE HINT-TRIGGERED ACTIVATION OF PAGES IN MEMORY (71) Applicant: Advanced Micro Devices, Inc., Santa Clara, CA (US)

(72) Inventors: Ravindra N. Bhargava, Austin, TX (US); Philip S. Park, Fort Collins, CO (US); Vydhyanathan Kalyanasundharam, Santa Clara, CA (US); James Raymond Magro, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,514

(22) Filed: Apr. 6, 2020

(65) Prior Publication Data
US 2020/0401321 A1 Dec. 24, 2020

Related U.S. Application Data (63) Continuation of application No. 15/818,212, filed on Nov. 20, 2017, now Pat. No. 10,613,764.

(51) Int. Cl.
*G06F 3/06* (2006.01)
*G06F 13/16* (2006.01)
*G06F 9/52* (2006.01)

(52) U.S. Cl.
CPC .......... *G06F 3/0611* (2013.01); *G06F 3/0656* (2013.01); *G06F 3/0689* (2013.01);
(Continued)

(58) Field of Classification Search
CPC .... G06F 3/0611; G06F 3/0656; G06F 3/0689; G06F 9/528; G06F 13/1636; G06F 13/161
See application file for complete search history.

(56) References Cited

U.S. PATENT DOCUMENTS 4,933,837 A 6/1990 Freidin
5,375,089 A 12/1994 Lo
(Continued)

OTHER PUBLICATIONS

International Search Report and Written Opinion in International Application No. PCT/US2018/051622, dated Dec. 19, 2018, 10 pages.

(Continued)

*Primary Examiner* — Mark A Giardino, Jr.
(74) *Attorney, Agent, or Firm* — Kowert Hood Munyon Rankin and Goetzel PC; Rory D. Rankin (57) ABSTRACT Systems, apparatuses, and methods for performing efficient memory accesses for a computing system are disclosed. In various embodiments, a computing system includes a computing resource and a memory controller coupled to a memory device. The computing resource selectively generates a hint that includes a target address of a memory request generated by the processor. The hint is sent outside the primary communication fabric to the memory controller. The hint conditionally triggers a data access in the memory device. When no page in a bank targeted by the hint is open, the memory controller processes the hint by opening a target page of the hint without retrieving data. The memory controller drops the hint if there are other pending requests that target the same page or the target page is already open.

19 Claims, 5 Drawing Sheets (52) U.S. Cl.
CPC ............ *G06F 9/528* (2013.01); *G06F 13/161* (2013.01); *G06F 13/1636* (2013.01)

(56) References Cited

U.S. PATENT DOCUMENTS

| | | | |
|---|---|---|---|
| 5,765,214 | A | 6/1998 | Sywyk |
| 6,230,235 | B1 * | 5/2001 | Lu .......................... G06F 9/5016 365/222 |
| 6,470,433 | B1 | 10/2002 | Prouty et al. |
| 6,615,322 | B2 | 9/2003 | Arimilli et al. |
| 6,715,039 | B1 | 3/2004 | Michael et al. |
| 6,760,817 | B2 | 7/2004 | Arimilli et al. |
| 6,892,280 | B2 | 5/2005 | Nakamura |
| 7,340,567 | B1 | 3/2008 | Chou et al. |
| 7,689,774 | B2 | 3/2010 | OConnell et al. |
| 7,886,112 | B2 | 2/2011 | Ohtsuka |
| 8,176,251 | B2 | 5/2012 | Bali et al. |
| 8,347,036 | B2 | 1/2013 | Cargnoni et al. |
| 8,621,157 | B2 | 12/2013 | Loh |
| 10,613,764 | B2 | 4/2020 | Bhargava et al. |
| 2002/0049889 | A1 | 4/2002 | Hoogerbrugge et al. |
| 2002/0107949 | A1 | 8/2002 | Rawson |
| 2002/0107955 | A1 | 8/2002 | Rawson |
| 2002/0156977 | A1 | 10/2002 | Derrick et al. |
| 2003/0088739 | A1 | 5/2003 | Wilkes et al. |
| 2003/0163649 | A1 | 8/2003 | Kapur et al. |
| 2003/0172236 | A1 | 9/2003 | Iyengar et al. |
| 2003/0177305 | A1 | 9/2003 | Hetrick |
| 2003/0177320 | A1 | 9/2003 | Sah et al. |
| 2003/0200388 | A1 | 10/2003 | Hetrick |
| 2004/0022094 | A1 | 2/2004 | Radhakrishnan et al. |
| 2004/0205298 | A1 | 10/2004 | Bearden et al. |
| 2005/0086595 | A1 | 4/2005 | Campbell et al. |
| 2005/0132140 | A1 | 6/2005 | Burger et al. |
| 2005/0216678 | A1 | 9/2005 | Jeddeloh |
| 2005/0268062 | A1 | 12/2005 | Nagase et al. |
| 2006/0179236 | A1 | 8/2006 | Shafi |
| 2006/0224831 | A1 | 10/2006 | Yoshikawa |
| 2006/0259733 | A1 | 11/2006 | Yamazaki et al. |
| 2006/0268704 | A1 | 11/2006 | Ansari et al. |
| 2007/0106848 | A1 | 5/2007 | Krishnaiyer et al. |
| 2007/0156964 | A1 | 7/2007 | Sistla |
| 2007/0174562 | A1 | 7/2007 | Jeddeloh |
| 2007/0185933 | A1 | 8/2007 | Dao et al. |
| 2008/0127131 | A1 | 5/2008 | Gao et al. |
| 2008/0320228 | A1 | 12/2008 | Brunheroto et al. |
| 2009/0037660 | A1 | 2/2009 | Fairhurst |
| 2009/0119488 | A1 | 5/2009 | Kadambi et al. |
| 2009/0157985 | A1 | 6/2009 | Stevens et al. |
| 2009/0198909 | A1 | 8/2009 | Speight et al. |
| 2009/0199190 | A1 | 8/2009 | Chen et al. |
| 2010/0037034 | A1 | 2/2010 | Balakrishnan et al. |
| 2010/0262787 | A1 | 10/2010 | Arimilli et al. |
| 2011/0173395 | A1 | 7/2011 | Bhattacharjee et al. |
| 2011/0307664 | A1 | 12/2011 | Paver et al. |
| 2012/0054445 | A1 | 3/2012 | Swart et al. |
| 2012/0054447 | A1 | 3/2012 | Swart et al. |
| 2012/0131305 | A1 | 5/2012 | Punyamurtula |
| 2018/0364919 | A1 * | 12/2018 | Hall, Jr. ................ G06F 3/0683 |
| 2020/0285580 | A1 * | 9/2020 | Subramanian .......... G06F 13/16 |

OTHER PUBLICATIONS

Igehy et al., "Prefetching in a Texture Cache Architecture", Proceedings of the ACM Siggraph/Eurographics workshop on Graphics hardware, Aug. 1998, 11 pages.

Jeong et al., "Cost-Sensitive Cache Replacement Algorithms", International Symposium on High-Performance Computer Architecture, Feb. 2003, 10 pages.

Kron et al., "Double-DIP: Augmenting DIP with Adaptive Promotion Policies to Manage Shared L2 Caches", 2nd Workshop on Chip Multiprocessor Memory Systems and Interconnects (CMP-MSI), 2008, 9 pages.

Qureshi et al., "Adaptive Insertion Policies for High-Performance Caching", International Symposium on Computer Architecture (ISCA), May 2007, 11 pages.

Keramidas et al., "Where Replacement Algorithms Fail: a Thorough Analysis", Proceedings of the 7th ACM International Conference on Computing Frontiers, 2010, 10 pages.

Jeong et al., "Cache Replacement Algorithms with Nonuniform Miss Costs", IEEE Transactions on Computers, Apr. 2006, pp. 353-365, vol. 55, No. 4.

Jeong et al., "Simple Penalty-Sensitive Cache Replacement Policies", Journal of Instruction-Level Parallelism 10, 2008, pp. 1-24.

* cited by examiner

SPECULATIVE HINT-TRIGGERED ACTIVATION OF PAGES IN MEMORY

CROSS REFERENCE TO RELATED APPLICATIONS

This application is a continuation of U.S. patent application Ser. No. 15/818,212, entitled "SPECULATIVE HINT-TRIGGERED ACTIVATION OF PAGES IN MEMORY", filed Nov. 20, 2017, the entirety of which is incorporated herein by reference.

BACKGROUND

Description of the Related Art

Memory access latencies for system memory, such as off-chip dynamic random access memory (DRAM), are typically appreciable. To reduce the effect of this latency penalty and taking into account that read operations are on the critical path for program execution, read operations are assigned a higher priority than write operations. When read operations are being serviced, the system memory drives the off-chip data bus. The requested data is sent to the corresponding processing unit via the memory controller. In the meantime, write operations are stored in a write queue in the memory controller.

At a given time, the memory controller determines it is time to switch from sending read operations to sending write operations. The off-chip data bus is turned around so that the memory controller drives the off-chip data bus with write data to the system memory. Scheduling memory access requests based at least upon access type takes advantage of both temporal and spatial localities many times. However, scheduling memory access requests based at least upon access type still does not reduce the latencies within the system memory. Accesses to the system memory utilize multiple, complex DRAM transactions. Each of the different DRAM transactions, such as activation/open, column access, read access, write access, and precharge/close, has a different respective latency. Often, the activation and precharge transactions have significantly higher latencies than the read access and write access transactions.

In view of the above, efficient methods and systems for performing efficient memory accesses for a computing system are desired.

BRIEF DESCRIPTION OF THE DRAWINGS

The advantages of the methods and mechanisms described herein may be better understood by referring to the following description in conjunction with the accompanying drawings, in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient memory accesses for a computing system are disclosed. In one embodiment, a computing system includes one or more computing resources and external system memory such as one of a variety of types of dynamic random access memory (DRAM). Examples of the computing resources include a general-purpose central processing unit (CPU), a graphics processing unit (GPU), an accelerated processing unit (APU), and so forth. The computing resources generate memory access requests. In various embodiments, a given computing resource includes a cache memory subsystem. When the given computing resource determines a memory access request misses within the cache memory subsystem, the given computing resource sends the memory access request to a given memory controller of one or more memory controllers.

The given memory controller is coupled to a memory device associated with a target address of the memory access request. If the computing system includes multiple memory devices, then the address spaces are distributed among the multiple memory devices by the operating system. The memory controller supports mapping between the request addresses of the computing resources and addresses pointing to storage locations in the memory device(s). In some embodiments, a memory controller is connected to a single memory device. In other embodiments, a memory controller is connected to multiple memory devices.

In various embodiments, the given computing resource determines that a generated memory access request (e.g., a request to read data from the memory or write data to the memory) qualifies for hint generation. In the present discussion, a memory request that qualifies for hint generation is referred to as a "hint qualified" request. For purposes of discussion, a request is identified as hint qualified if it is identified as being latency-sensitive. However, as will be discussed, a request can be identified as hint qualified for reasons other than latency sensitivity. Generally speaking, a memory request that is hint qualified may be considered to have a higher priority than a memory request that is not hint qualified. Accordingly, in some embodiments, a determination that a memory request has a priority higher than a threshold may cause the memory request to be hint qualified. In some embodiments, the given computing resource maintains a first count of outstanding memory access requests for a given thread. In addition, the given computing resource maintains a second count of outstanding memory access requests for the given computing resource executing one or more threads. If each of the first count and the second count is relatively low, such as less than a particular threshold, then the given computing resource could be waiting for a memory access request to complete before continuing with further processing of the one or more threads. In addition, the transport bandwidth of the communication fabric is relatively low when the second count is relatively low.

In response to determining a latency-sensitive request is among the generated memory access requests, the given computing resource generates a hint based on the latency-sensitive access request. For example, the hint includes a target address of the latency-sensitive access request. In various embodiments, the hint is an activate-only request which is configured to cause the memory device to activate or open a target page identified to by the target address—without retrieving and returning data in the page. As described herein, the hint may also be referred to as a memory access request or memory request. Depending on the scenario, the hint may be sent to the memory controller before the latency-sensitive access request or it may be sent after the latency-sensitive access request. Either sequence is possible and contemplated.

In various embodiments, the hint is sent on sideband wires, rather than a communication fabric. Therefore, the hint should arrive at the memory controller before the corresponding latency-sensitive access request, and the target page should be open when the latency-sensitive access request arrives at the memory device through the communication fabric. The interface for the sideband wires does not support transport protocols including cache coherency checks, route ordering and quality of service decisions. In contrast, the interface for the communication fabric does support these transport protocols.

When the memory controller receives the hint, in one embodiment, the memory controller determines a target bank and the target page in the memory device for the hint. In an embodiment, when the memory controller determines at least no page in the target bank is open, the memory controller processes the hint by opening the target page. If a page is open in the target bank, then the memory controller does not interfere with ongoing memory accesses by closing the page in order to open the target page. In an embodiment, the memory controller processes the hint by opening the target page, in further response to determining other received memory access requests do not have a same target page. Otherwise, the target page is going to be opened anyway. If the above conditions are not satisfied for processing the hint and opening the target page, then the memory controller drops the hint. In various embodiments, dropping the hint means a page is not opened responsive to the hint. In various embodiments, dropping the hint may include simply discarding the hint, indicating the processing of the hint is complete, and/or taking no further action on the hint.

Figure 1:
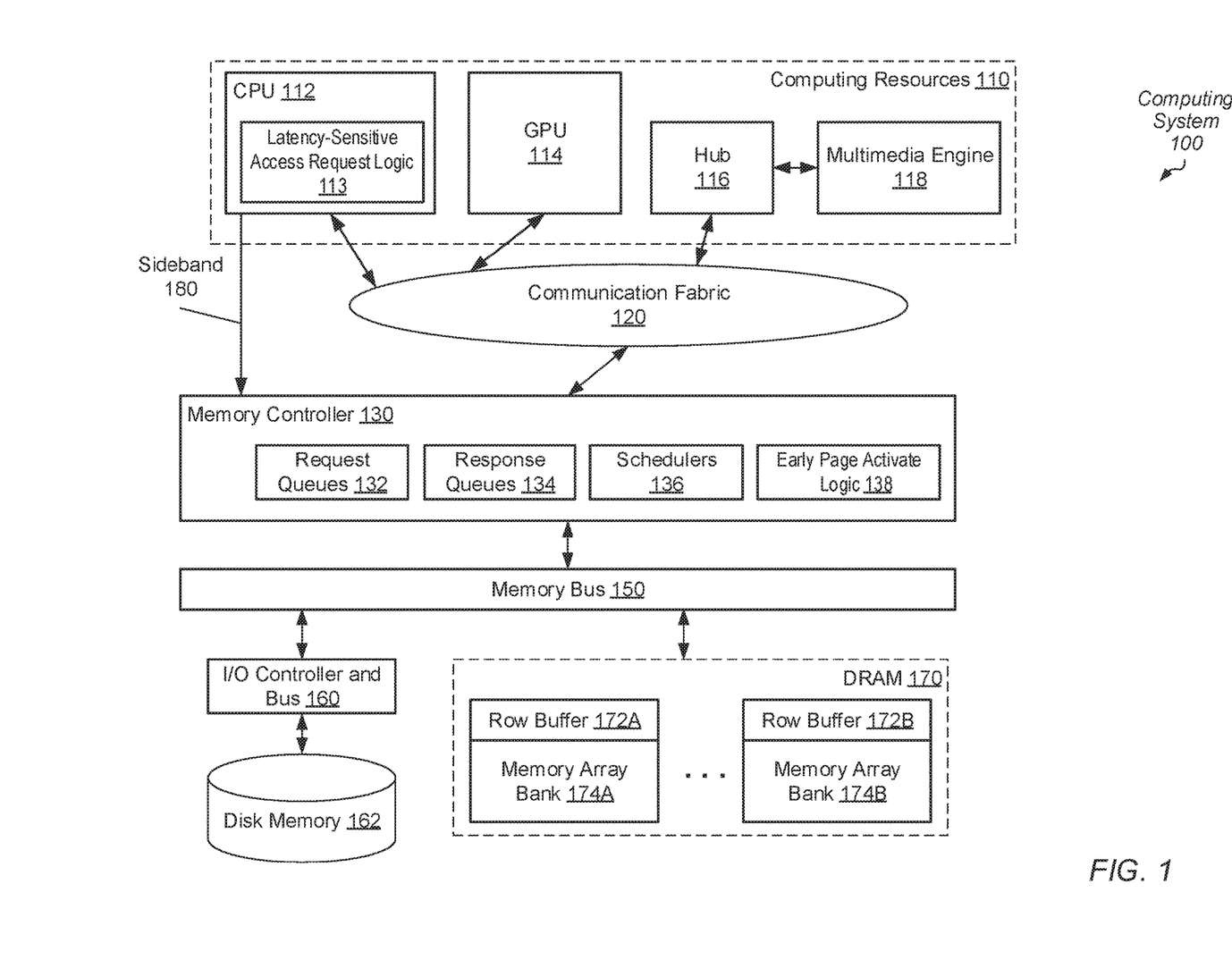
FIG. 1 is a block diagram of one embodiment of a computing system.

Referring to FIG. 1, a generalized block diagram of one embodiment of a computing system 100 is shown. As shown, computing system 100 includes communication fabric 120 between each of memory controller 130 and computing resources 110. In the illustrated embodiment, the computing resources include central processing unit (CPU) 112, graphics processing unit (GPU) 114 and Hub 116. Hub 116 is used for communicating with Multimedia Engine 118. Although a single memory controller 130 is shown, in other embodiments, another number of memory controllers are used in computing system 100.

In some embodiments, the components of computing system 100 are individual dies on an integrated circuit (IC), such as a system-on-a-chip (SOC). In other embodiments, the components are individual dies in a system-in-package (SiP) or a multi-chip module (MCM). In one embodiment, computing system 100 is a stand-alone system within a mobile computer, a smart phone, a smartwatch, or a tablet; a desktop; a server; or other. The CPU 112, GPU 114 and Multimedia Engine 118 are examples of computing resources capable of generating memory access requests, which are also referred to as memory requests. Although not shown, in other embodiments, other types of computing resources are included in computing resources 110.

In various embodiments, memory controller 130 receives memory requests from computing resources 110 via the communication fabric 120 and sends the memory requests to one or more of off-chip disk memory 162 and system memory, which is implemented as off-chip dynamic random access memory (DRAM) 170. Memory controller 130 also receives responses from DRAM 170 and disk memory 162 and sends the responses to a corresponding source of the request in computing resources 110.

In some embodiments, memory controller 130 receives memory requests from a given one of the computing resources 110 via sideband 180. In an embodiment, sideband 180 includes direct wire connections to memory controller 130, which allows control and data information to bypass communication fabric 120. In one embodiment, the given computing resource is CPU 112. In other embodiments, one or more of GPU 114, Hub 116 and other of computing resources 110 utilizes sideband 180. In other embodiments, multiple ones of computing resources 110 utilize a sideband to transfer information with memory controller 130 while bypassing communication fabric 120. In various embodiments, the interfaces for the sideband wires in CPU 112 and memory controller 130 do not support transport protocols, which include at least cache coherency checks, route ordering and quality of service decisions. In contrast, the interfaces for the communication fabric 120 in computing resources 110 and memory controller 130 do support these transport protocols.

Each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In one example, an accelerated processing unit (APU), a display controller, an audio processor, and so forth, are additional candidates to be included in processing units 110. An example of an APU is a CPU integrated on a same die with a GPU, a FPGA, or other processing unit, thus improving data transfer rates between these units while reducing power consumption. In other embodiments, the APU includes video processing and other application-specific accelerators.

In various embodiments, communication fabric 120 transfers traffic back and forth between computing resources 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

In some embodiments, the address space of the computing system 100 is divided among at least CPU 112, GPU 114 and Hub 116 and one or more other components such as input/output peripheral devices (not shown) and other types of computing resources. Memory maps are maintained for determining which addresses are mapped to which component, and hence to which one of CPU 112, GPU 114 and Hub 116 a memory request for a particular address should be routed.

As software applications access more and more data, the memory subsystem is utilized more heavily. Latencies become more crucial. More on-chip memory storage is used to reduce interconnect latencies. For example, one or more of computing resources 110 include cache memory subsystems to reduce memory latencies for a respective processor core. In addition, in some embodiments, a shared cache memory subsystem is used by processor cores as a last-level cache (LLC) before accessing the off-chip DRAM 170 and/or the off-chip disk memory 162.

A reduced miss rate is achieved by the additional memory provided by cache memory subsystems and latency gaps are hidden between a given one of the processor cores in processing units 110 and the off-chip memory. However, there is limited amount of on-die area to use for cache memory subsystems a significant number of memory access requests are still sent to the off-chip memory such as the DRAM 170 and/or the disk memory 162.

The cache memory subsystems (not shown) in the computing resources 110 include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and may be of any size. In addition, each of the terms "cache tag", "cache line tag", and "cache block tag" is interchangeable. In various embodiments, the cache memory subsystems are implemented as a hierarchy of caches. As used herein, the term "access" refers to performing a memory read request or a memory write request operation that results in a cache hit if the requested data of a corresponding request address resides in the cache. Alternatively, the memory access request results in a cache miss if the requested data does not reside in the cache.

If a cache miss occurs in each level of the cache memory subsystem hierarchy, then a memory access request is generated. In an embodiment, latency-sensitive access request logic 113, which is also referred to as logic 113, determines a generated memory access request is a latency-sensitive access request. In some embodiments, logic 113 maintains a first count of outstanding memory access requests for a given thread. In addition, logic 113 maintains a second count of outstanding memory access requests for CPU 112 executing one or more threads. If each of the first count and the second count is relatively low, such as less than a respective threshold, then CPU 112 could be waiting for a memory access request to complete before continuing with further processing of the one or more threads. In addition, the transport bandwidth of communication fabric 120 is relatively low when the second count is relatively low.

In response to determining a latency-sensitive access request is among the generated memory access requests, logic 113 generates a hint based on the latency-sensitive access request. The latency-sensitive access request is also referred to as the latency-sensitive request. In some embodiments, the hint includes a target address of the latency-sensitive request. In various embodiments, the hint is an activate-only request configured to perform an activate (or open) transaction for a target page. In various embodiments, the hint is sent to memory controller 130 via sideband 180, rather than via communication fabric 120. Therefore, the hint should arrive at memory controller 130 before the corresponding latency-sensitive access request arrives after being sent from CPU 112 through communication fabric 120. The target page should be open when the corresponding latency-sensitive request arrives at DRAM 170 through communication fabric 120, memory controller 130 and memory bus 150.

Memory controller 130 receives the hint from sideband 180 and translates the target address corresponding to the requested block. Similarly, memory controller 130 translates the target addresses of memory access requests received from computing resources 110 via communication fabric 120. Early Activate Logic 138 (alternatively referred to as "logic 138") is configured to process received hints. Based at least in part on the hint, logic 138 determines a target bank of the memory array banks 174A-174B and a target page within the target bank.

In an embodiment, when logic 138 determines no page in the target bank is currently open, logic 138 opens the page identified by the hint (i.e., the target page). For example, the contents of a page identified by the target address are accessed and stored in one of the row buffers 172A-172B. In various embodiments, the hint is processed as an activate-only request without completing a read or write operation. In other words, the hint causes the targeted page to be opened, but the targeted data is not retrieved by the memory controller and returned to a requestor as would be the case in an ordinary read operation. In various embodiments, the memory controller 130 sends the activate-only request to DRAM 170 through the memory bus 150.

If, after receiving a hint, it is determined that a page other than the target page is currently open in the target bank, then logic 138 does not interfere with ongoing memory accesses (e.g., by closing the currently open page and opening the target page). In such a case the hint may then be discarded without further action being taken. If, after receiving the hint, it is determined that a page is not currently open in the target bank and other received memory access requests do not have a same target page or target a bank storing the target page, the logic 138 opens the target page. If the target page is not opened responsive to the received hint, the target page will be opened when the subsequently received memory request that corresponds to the received hint is serviced.

In various embodiments, when a hint is received and the logic 138 determines that a page is open in a bank storing the target page, logic 138 begins measuring a duration of time that the page remains open. If logic 138 determines the duration of time exceeds a threshold, then logic 138 drops the hint without further action.

In various embodiments, logic 138 includes queues for storing hints received via sideband 180. In some embodiments, logic 138 does not use any scheduling logic, such as schedulers 136, for scheduling the hints for out-of-order issue to DRAM 170. Rather, in an embodiment, logic 138 schedules received hints as they arrive and sends the hints to DRAM 170 in-order if the hints are not dropped.

Memory controller 130 also sends memory access requests in addition to activate-only requests to off-chip DRAM 170 through the memory bus 150. In various embodiments, off-chip DRAM 170 is filled with data from the off-chip disk memory 162 through the I/O controller and bus 160 and the memory bus 150. A corresponding cache fill line with the requested block is conveyed from the off-chip DRAM 170 to a corresponding one of the cache memory subsystems in processing units 110 in order to complete the original memory access request. The cache fill line is placed in one or more levels of caches.

In various embodiments, off-chip DRAM 170 is a type of dynamic random-access memory that stores each bit of data in a separate capacitor within an integrated circuit. The capacitor can be either charged or discharged. These two states are used to represent the two logical values of a bit. The DRAM 170 utilizes a single transistor and a capacitor per bit. Compared to six transistors used in on-chip synchronous RAM (SRAM), the DRAM reaches higher densities. Unlike HDDs and flash memory, the DRAM 170 is volatile memory, rather than non-volatile memory. The DRAM 170 loses its data relatively quickly when a power supply is removed.

In an embodiment, off-chip DRAM 170 includes a multi-channel memory architecture. This type of architecture increases the transfer speed of data to the memory controller 130 by adding more channels of communication between them. In an embodiment, the multi-channel architecture utilizes multiple memory modules and a motherboard and/or a card capable of supporting multiple channels. In another embodiment, DRAM 170 utilizes three-dimensional integrated circuits (3D ICs) to provide system memory. In such an embodiment, the 3D integrated DRAM provides both low-latency interconnects and a significantly large amount of additional on-chip memory storage to reduce off-chip memory accesses. In various embodiments, DRAM 170 is used as system memory for computing system 100. Other memory technologies for system memory that use a row-based access scheme including one or more row buffers or other equivalent structures are possible and contemplated. Examples of other memory technologies include phase-change memories, spin-torque-transfer resistive memories, memristors, and so forth.

As shown, DRAM 170 includes multiple memory array banks 174A-174B. Each one of the banks 174A-174B includes a respective one of the row buffers 172A-172B. Each one of the row buffers 172A-172B stores data in an accessed row of the multiple rows within the memory array banks 174A-174B. The accessed row is identified by a DRAM address in the received memory access request. Control logic within DRAM 170 perform complex transactions such as activation and precharge of data and control lines within DRAM 170 once to access an identified row and once to put back the modified contents stored in the row buffer to the identified row.

In various embodiments, DRAM 170 includes one or more memory channels, one or more memory modules or devices per channel, one or more ranks per memory module, one or more banks per rank, and one or more rows per bank. Typically, each row stores a page of data. The size of the page is chosen based on design considerations. The page can be one kilobyte (1 KB), four kilobytes (4 KB), or any size based on design choices. Accesses of DRAM 170 can be inefficient due to the complex transactions occurring within DRAM 170. The activation stage, precharge stage, switches to different banks between adjacent accesses, switches to different ranks between adjacent accesses, and so forth, create significant latencies. In various embodiments, memory bus 150 utilizes a bi-directional shared-bus structure. One or more bus propagation latencies are needed for this glitch to dissipate.

One example of a protocol for a respective interface to the memory controller 130 is a double data rate (DDR) type of protocol. The protocol determines values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The memory controller 130 includes control circuitry for interfacing to the memory channels and following a corresponding protocol.

As shown, memory controller 130 includes request queues 132 for queuing memory access requests received from computing resources 110 via communication fabric 120. Memory controller 130 also has a response queue 134 for storing responses received from DRAM 170. In an embodiment, request queues 132 include one or more queues for storing memory access requests. In another embodiment, request queues 132 include a read queue for storing memory read requests and a separate write queue for storing memory write requests. In other embodiments, request queues 132 include a unified queue for storing both memory read requests and memory write requests.

In yet other embodiments, request queues 132 include one or more queues for storing received memory access requests and a separate queue for storing scheduled memory access requests selected from the one or more queues. Schedulers 136 include one or more scheduling blocks for selecting memory access requests stored in request queues 132 for out-of-order issue to DRAM 170. Therefore, memory controller 130 supports out-of-order issue of the memory access requests to DRAM 170 based on priorities and target addresses. In some embodiments, memory controller 130 also supports out-of-order issue of the responses to computing resources 110 based on at least priorities. In various embodiments, schedulers 136 in memory controller 130 schedules the issue of the stored memory access requests based on a quality-of-service (QoS) or other priority information, age, a process or thread identifier (ID), and a relationship with other stored requests such as targeting a same memory channel, targeting a same rank, targeting a same bank and/or targeting a same page.

In various embodiments, memory bus 150 supports sending data traffic in a single direction for a given amount of time, such as during a given mode of the read mode and the write mode, and then sends data traffic in the opposite direction for another given amount of time such as during the other mode of the read mode and the write mode. In an embodiment, memory bus 150 utilizes at least a command bus and a data bus, and memory bus 150 supports a read mode for sending data traffic on the data bus from DRAM 170 to memory controller 130. Additionally, memory bus 150 supports a write mode for sending data traffic on the data bus from memory controller 130 to DRAM 170.

The off-chip disk memory 162 may provide a non-volatile, random access secondary storage of data. In one embodiment, the off-chip disk memory 162 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks. In another embodiment, the off-chip disk memory 162 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may include banks of Flash memory.

Figure 2:
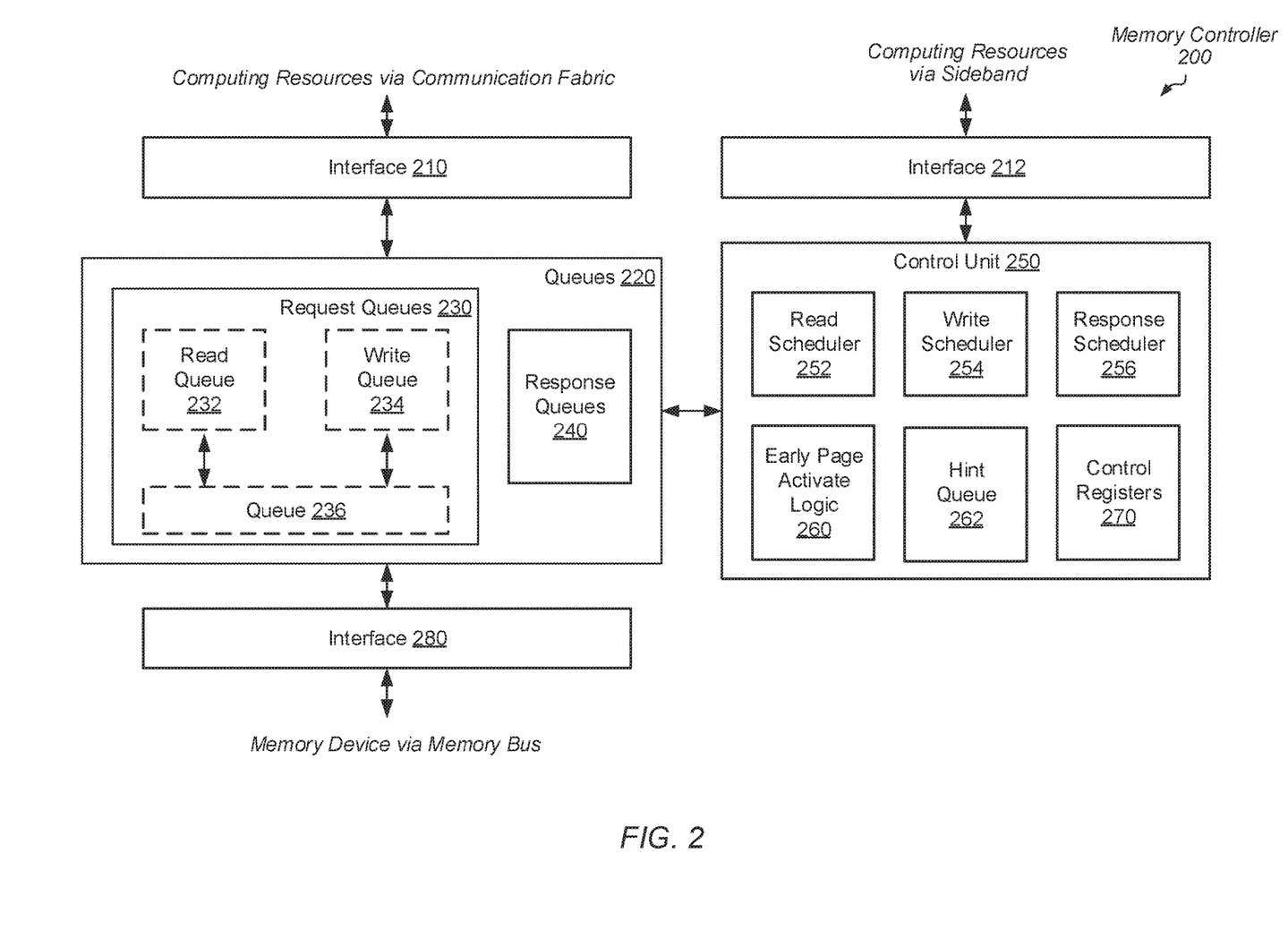
FIG. 2 is a block diagram of one embodiment of a memory controller.

Referring to FIG. 2, a generalized block diagram of one embodiment of a memory controller 200 is shown. In the illustrated embodiment, memory controller 200 includes an interface 210 to computing resources via a communication fabric, interface 212 to a given one of the computing resources via a sideband, queues 220 for storing received memory access requests and received responses, control unit 250 and an interface 280 to a memory device via at least a data bus of a memory bus. Each of interfaces 210 and 280 supports respective communication protocols.

In an embodiment, queues 220 includes a read queue 232 for storing received read requests and a separate write queue 234 for storing received write requests. In other embodiments, queues 220 includes a unified queue for storing both memory read requests and memory write requests. In one embodiment, queues 220 includes queue 236 for storing scheduled memory access requests selected from read queue 222, write queue 234 or a unified queue if one is used. In an embodiment, hint queue 262 in control unit 250 stores hints received via the sideband. In some embodiments, control registers 270 store an indication of a current mode. For example, the off-chip memory data bus and memory device support either a read mode or a write mode at a given time. Therefore, traffic is routed in a given single direction during the current mode and changes direction when the current mode ends.

In some embodiments, read scheduler 252 includes arbitration logic for selecting read requests from the read queue 220 out-of-order. Read scheduler 232 schedules the out-of-order issue of the stored requests within the read queue 220 to the memory device based on a quality-of-service (QoS) or other priority information, age, a process or thread identifier (ID), and a relationship with other stored requests such as targeting a same memory channel, targeting a same rank, targeting a same bank and/or targeting a same page. Write scheduler 254 includes similar selection logic for the write queue 234. In an embodiment, response scheduler 256 includes similar logic for issuing, based on priorities, responses out-of-order to the computing resources, which were received from the memory device.

Early Page Activate Logic 260 is used to process received hints stored in hint queue 262. Early Page Activate Logic 260 is also referred to as logic 260. In various embodiments, logic 260 includes the functionality of logic 138 (of FIG. 1). In various embodiments, logic 260 determines a target bank of memory array banks and a target page within the target bank for a given hint stored in queue 262. When logic 260 determines at least no page in the target bank is open, logic 260 processes the given hint by opening the target page.

In an embodiment, logic 260 sends an activate-only request corresponding to the given hint to the memory device via interface 280 and the memory bus. In an embodiment, logic 260 sends the activate-only request from queue 262 to the memory device, in further response to determining other received memory access requests do not have a same target page. Otherwise, the target page is going to be opened anyway. In an embodiment, the activate-only request is a transaction that processes no actual memory access such as a read operation and a write operation. Rather, the target page is opened (activated) and the transaction completes.

If logic 260 determines a page is currently open in the target bank corresponding to a hint stored in hint queue 262, then in an embodiment, logic 260 drops the hint. In an embodiment, logic 260 deallocates a corresponding entry in hint queue 262. If logic 260 determines other received and scheduled memory access requests have a same target page as a target page corresponding to a hint stored in hint queue 262, then in an embodiment, logic 260 drops the hint. When determining whether to drop a hint, in some embodiments, logic 260 considers only scheduled memory access requests which have not yet been sent to the memory device. When determining whether to drop a hint, in other embodiments, logic 260 considers only scheduled memory access requests which have been sent to the memory device but have not yet received a response. When determining whether to drop a hint, in yet other embodiments, logic 260 considers both scheduled memory access requests which have not yet been sent to the memory device and memory requests which have been sent to the memory device but have not yet received a response.

Figure 3:
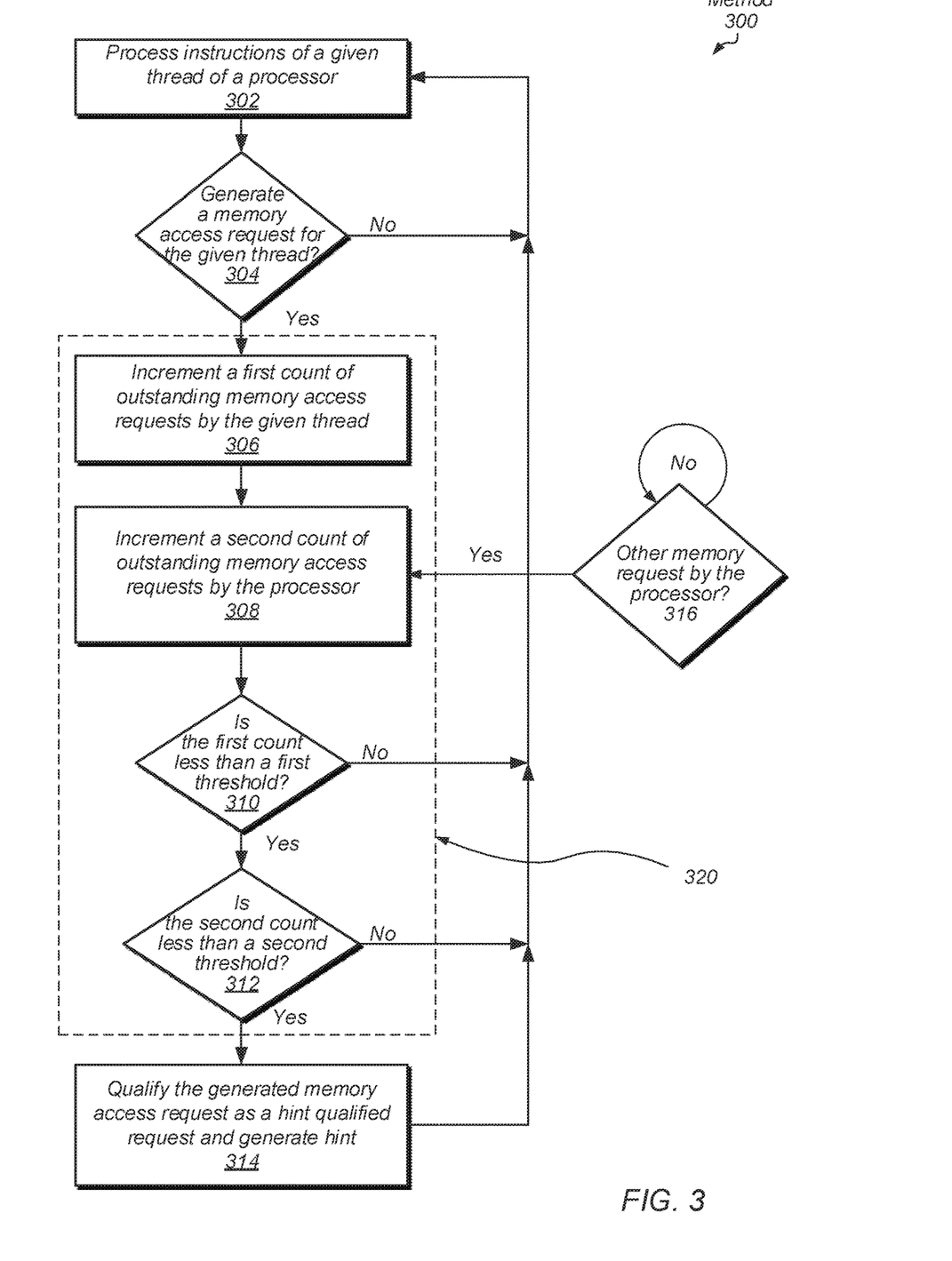
FIG. 3 is a flow diagram of one embodiment of a method for generating an early page activate hint for memory.

Referring now to FIG. 3, one embodiment of a method 300 for generating an early page activate hint for memory is shown. For purposes of discussion, the steps in this embodiment (as well as in FIGS. 4-5) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

In the following discussion of FIG. 3, one embodiment for identifying latency sensitive requests is shown. In particular, the embodiment of FIG. 3 identifies memory requests as hint qualified if they are determined to be latency sensitive. However, other embodiments for determining whether requests are latency sensitive are possible and are contemplated. For example, quality of service or other priority indications may be used to indicate that some requests are more latency sensitive than others. Further, in some embodiments conditions other than whether a request is latency sensitive may be used for determining whether a request is hint qualified a hint is to be conveyed. For example, workload balancing considerations or otherwise may be used to set priorities or otherwise select memory requests as being hint qualified. Numerous such embodiments are possible and are contemplated. For purposes of discussion, latency sensitive requests and other requests identified for hint generation may generally be referred to as "hint qualified" requests.

When executing the computer programs, a processor of one or more processors in a given computing resource processes instructions of a given thread (block 302). If there is a cache miss for the memory request in the processor, a memory access request is generated for conveyance to the memory controller ("yes" branch of the conditional block 304) and a first count of memory access requests for the given thread is incremented (block 306). In addition, a second count of memory access requests for the processor executing one or more threads is also incremented (block 308). While the first count represents a count that is particular to the given thread, the second count represents a count of memory access requests for all threads in the processor. As such, the second count it also incremented (block 316) when memory accesses requests are generated by other threads in the processor.

If the first count is less than a first threshold ("yes" branch of the conditional block 310), and the second count is less than a second threshold ("yes" branch of the conditional block 312), then the generated memory access request (block 304) is determined to be hint qualified and an activate-only hint is generated (block 314). With each of the first count and the second count being below the corresponding thresholds, a prediction may be made that the processor executing the given thread is waiting for a memory access request to complete before continuing with further processing of the one or more threads. In addition, when the counts are below the threshold, the transport bandwidth of the communication fabric may be lower than if the counts where above the threshold. In such a case, sending a generated hint corresponding to the latency-sensitive request to the memory controller via a sideband may have a reduced chance of interfering with the processing of other memory access requests. As noted, other embodiments may use considerations other than latency sensitivity to identify memory requests as being hint qualified. As such, block 320 of FIG. 3 may be replaced by other steps for identifying such requests based on different and/or other considerations such as quality of service, workload, explicitly indicated priorities, a source of a request, or otherwise.

Figure 4:
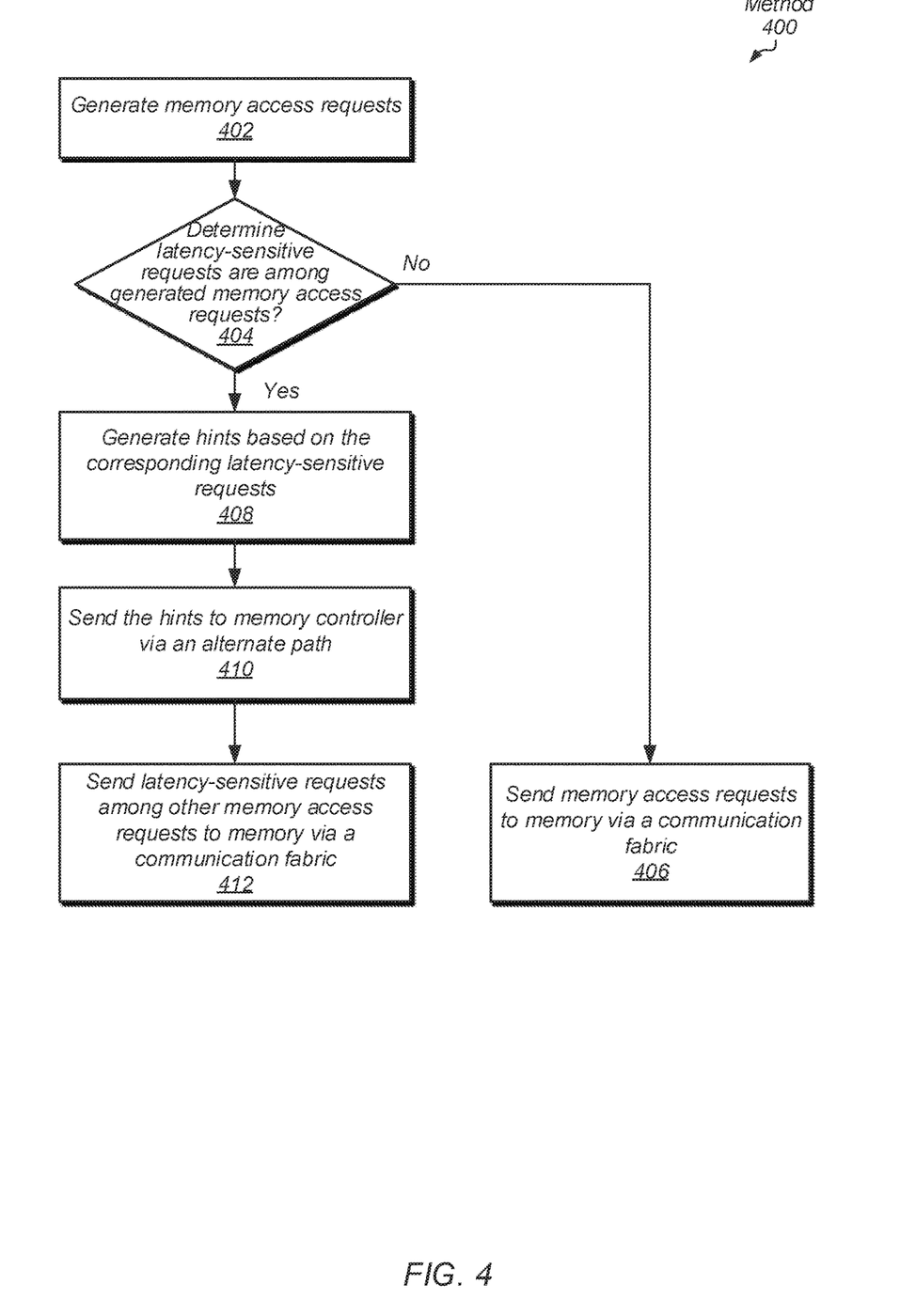
FIG. 4 is a flow diagram of one embodiment of a method for sending memory access traffic from a processor to a memory controller.

Referring to FIG. 4, another embodiment of a method 400 for sending memory access traffic from a processor to a memory controller is shown. Memory access requests are generated (block 402). For example, in an embodiment, a processor has searched a cache memory subsystem and has not found requested data. If latency-sensitive requests are not among the generated memory access requests ("no" branch of the conditional block 404), then the memory access requests are sent to memory via a communication fabric (block 406). As described earlier, in an embodiment, one or more counts of generated memory access requests for each thread and for an entire computing resource or multiple computing resource are maintained in order to determine whether a given thread has execution held up while waiting for data and whether the communication fabric is congested.

If latency-sensitive requests are among the generated memory access requests ("yes" branch of the conditional block 404), then hints are generated based on the corresponding latency-sensitive requests (block 408). In various embodiments, the hints are activate-only requests and are sent to the memory controller via a path different from the communication fabric normally used to convey memory requests (block 410). In various embodiments, the alternate path has a lower latency for transmission of a request from a requestor to the memory controller. In other words, a hint or other request conveyed via the alternate path will reach the memory controller in a shorter amount of time than if it had been conveyed via the communication fabric. In various embodiments, the alternate path is a sideband path or channel. In an embodiment, the interfaces for sideband wires do not support transport protocols including cache coherency checks, route ordering and quality of service decisions. In contrast, the interfaces for the communication fabric do support these transport protocols. The latency-sensitive requests are sent among other memory access requests to memory via the communication fabric (block 412). Therefore, the hint should arrive at the memory controller before the corresponding latency-sensitive access request, and the target page should be open when the latency-sensitive access request arrives at the memory device through the communication fabric.

Figure 5:
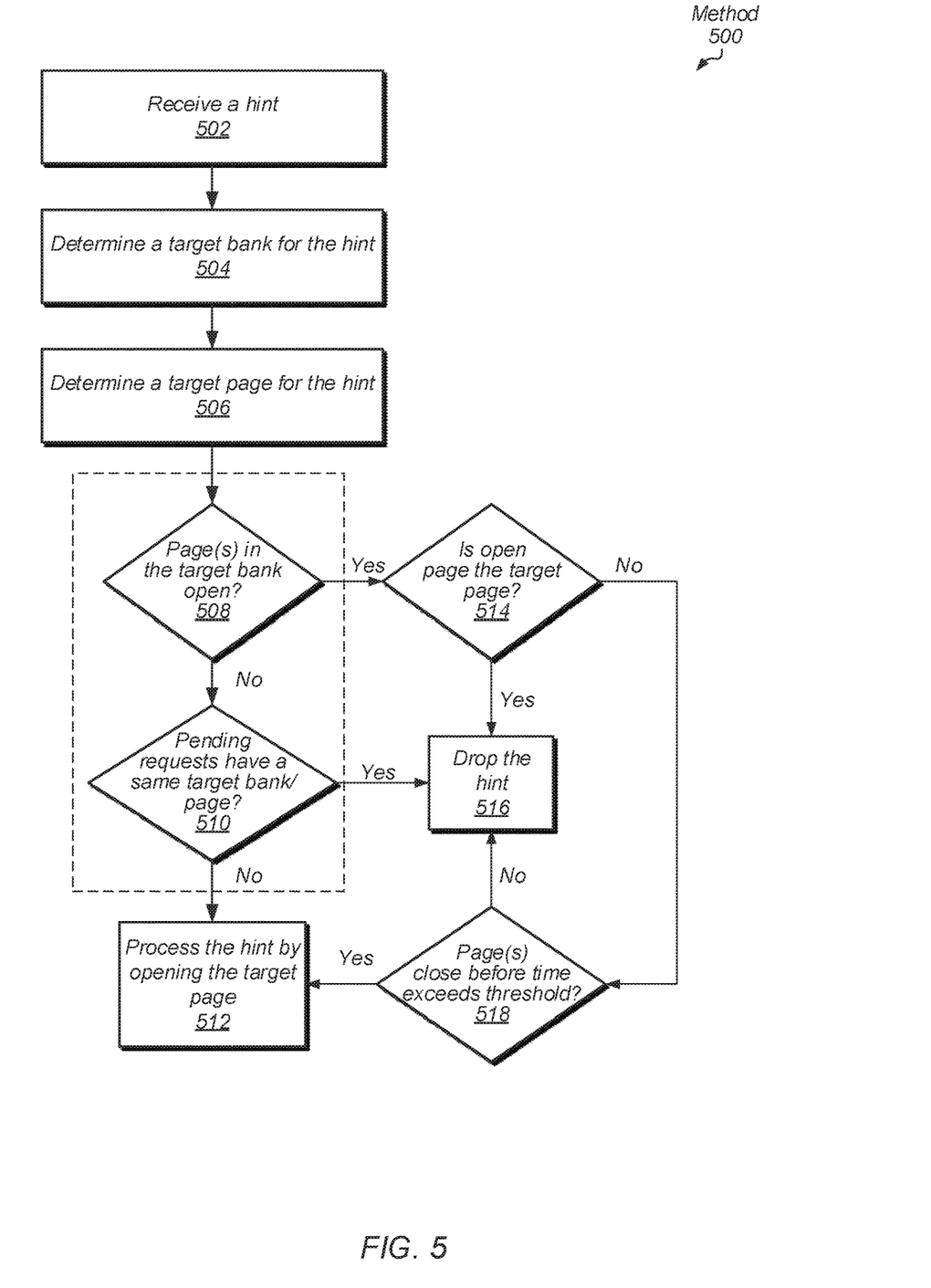
FIG. 5 is a flow diagram of another embodiment of a method for determining whether to processor or drop a received early page activate hint.

Referring to FIG. 5, another embodiment of a method 500 for processing an early page activate hint is shown. As shown, a hint is received (e.g., via an alternate path) (block 502) and a target bank is determined for the hint (block 504). In various embodiments, the hint is an activate-only request. Further, a target page is determined for the hint (block 506). In various embodiments, each of the target bank and the target page is determined from an address received with or otherwise associated with the received hint. In some embodiments, fields within the target address include a page index and a bank index. In some embodiments, other portions of the target address include one or more of a channel index, a sub array index, or otherwise, to identify a target bank within one of a variety of DRAM types. In various embodiments, a given row in the target bank that stores the target page is identified by the page index.

If a page is currently open in the target bank when the hint is processed by the memory controller ("yes" branch of the conditional block 508), then a determination is made as to whether target page is open (block 514). If the target page is already open, the hint is dropped (block 516). Alternatively, if a page is open but it is not the target page (514), then a count or other measure of time is initiated while the page remains open. If the time reaches a threshold amount of time before the page is closed (block 518), then the hint is dropped (block 516). Conversely, if the page closes before the threshold amount of time is reached, then the hint is processed by opening the target page (block 512). In this case, block 518 effectively sets a time limit for how long processing of hint will be considered. If the threshold amount of time is reached, then the hint effectively times out and is dropped (block 516).

Returning to block 508, if no pages in the target bank are open when the hint is received or otherwise processed by the memory controller, then a determination is made as to whether there are other pending received requests that have a same target bank as that of the hint ("yes" branch of the conditional block 510). If so, then the hint is dropped (block 510). In such a scenario it may be assumed that the target page will be opened responsive to one of the other pending requests and opening the page responsive to the hint is not necessary. It is noted that in other embodiments, rather than determining if other requests have the same bank, a determination may be made as to whether other requests target the same page. Either or both or contemplated and could be used in an embodiment. If there are no other pending requests in block 510 that target the same page as the hint, then the hint is processed further by opening the target page (block 512). It is noted that while various steps in FIG. 5 are illustrated in a given order, other embodiments may alter the presented order. For example, rather than checking for open pages in block 508 before other pending requests in block 510, this order can be reversed. In such a case, the memory controller may first determine if there are other pending requests that target the same page as the hint. If so, then the hint may be dropped. If not, then a determination may be made as to whether there are any open pages in the target bank. Still further, other embodiments may not utilize a time out as depicted by block 518. Rather, some embodiments may simply drop the hint if a different page(s) is already open in the target bank. These and other embodiments are possible and are contemplated.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller comprising:
a first interface for receiving memory requests via a communication fabric; and
a second interface for receiving memory requests via an alternate path different from the communication fabric, wherein one or more memory requests received via the second interface are conditionally generated based on memory requests conveyed via the first interface;
wherein the one or more memory requests are generated based at least in part on
a first count being below a first threshold, wherein the first count corresponds to a number of outstanding memory requests by a thread; and
a second count being below a second threshold, wherein the second count corresponds to a number of outstanding memory requests of a processor executing the thread.

2. The memory controller as recited in claim 1, further comprising a third interface configured to be coupled to a memory device, wherein the memory controller is configured to send memory requests to the memory device in response to memory requests received via the first interface and the second interface.

3. The memory controller as recited in claim 2, wherein the one or more memory requests received via the second interface are activate only requests that do not cause retrieval of data.

4. The memory controller as recited in claim 3, wherein in response to receiving an activate only request, the memory controller is configured to send a corresponding activate only request via the third interface to the memory device.

5. The memory controller as recited in claim 4, wherein the activate only request is configured to open a given page targeted by a memory request received via the first interface.

6. The memory controller as recited in claim 1, wherein in response to receiving a given memory request, the memory controller is configured to:
identify a page targeted by the given memory request; and
drop the given memory request if the page targeted by the given memory request is open.

7. The memory controller as recited in claim 1, wherein in response to receiving a given memory request, the memory controller is configured to:
identify a page targeted by the given memory request; and
cause the page to be opened in response to a determination that the page is not open and no pending requests target a same page and bank as the given memory request.

8. A method for use in a computing system, the method comprising:

receiving memory requests via a communication fabric; and
receiving, via an alternate path different from the communication fabric, one or more memory requests that are conditionally generated based on memory requests conveyed via the communication fabric;
wherein the one or more memory requests are generated based at least in part on
a first count being below a first threshold, wherein the first count corresponds to a number of outstanding memory requests by a thread; and
a second count being below a second threshold, wherein the second count corresponds to a number of outstanding memory requests of a processor executing the thread.

9. The method as recited in claim 8, further comprising sending memory requests to a memory device in response to received memory requests.

10. The method as recited in claim 9, wherein the one or more memory requests received via the alternate path are activate only requests that do not cause retrieval of data.

11. The method as recited in claim 10, wherein in response to receiving an activate only request, the method further comprises sending a corresponding activate only request to the memory device.

12. The method as recited in claim 11, wherein the activate only request is configured to open a given page targeted by a memory request received via the alternate path.

13. The method as recited in claim 8, wherein in response to receiving a given memory request via the alternate path, the method comprises:
identifying a page targeted by the given memory request; and
dropping the given memory request if the page targeted by the given memory request is open.

14. The method as recited in claim 8, wherein in response to receiving a given memory request via the alternate path, the method comprises:
identifying a page targeted by the given memory request; and
causing the page to be opened in response to a determination that the page is not open and no pending requests target a same page and bank as the given memory request.

15. A computing system comprising:
a processor; and
a memory controller;
wherein the processor is configured to:
identify a first memory request;
generate a second memory request responsive to determining the first memory request is hint qualified, wherein the first memory request is determined to be hint qualified based at least in part on
a first count being below a first threshold, wherein the first count corresponds to a number of outstanding memory requests by a thread; and
a second count being below a second threshold, wherein the second count corresponds to a number of outstanding memory requests of a processor executing the thread;
send the first memory request to the memory controller via a communication fabric; and
send the second memory request to the memory controller via an alternate path different than the communication fabric.

16. The computing system as recited in claim 15, wherein to determine the first memory request is hint qualified, the processor is configured to determine the first memory request has a relatively high priority.

17. The computing system as recited in claim 16, wherein a memory request is deemed to have a relatively high priority if it is at least one of: a latency sensitive request, a request with a relatively high quality of service requirement, and a request that has a relatively high priority based on workload balancing considerations.

18. The computing system as recited in claim 15, wherein the processor is configured to determine the first memory request is not hint qualified when at least one of the first count not less than the first threshold and the second count is not less than the second threshold.

19. The computing system as recited in claim 15, wherein the second memory request is an activate only request configured to open a given page targeted by a memory request without retrieving data.

\* \* \* \* \*